Dec. 4, 1962 H. SEDLACEK 3,066,332
DETACHABLE BRIDGE
Filed May 19, 1959 5 Sheets-Sheet 1

*Inventor:*
HUGO SEDLACEK
BY
ATTORNEY.

Dec. 4, 1962 H. SEDLACEK 3,066,332
DETACHABLE BRIDGE
Filed May 19, 1959 5 Sheets-Sheet 2
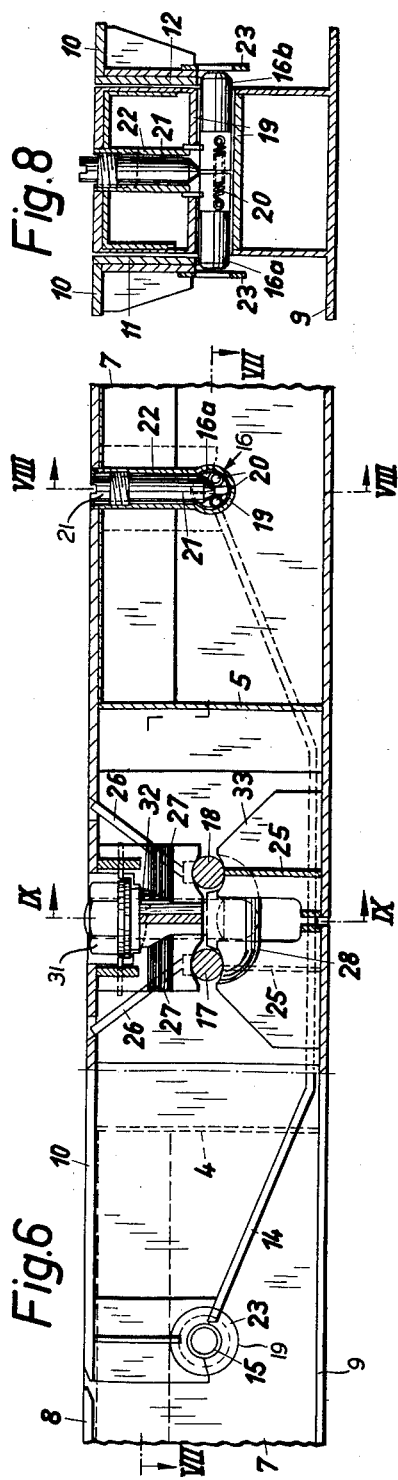
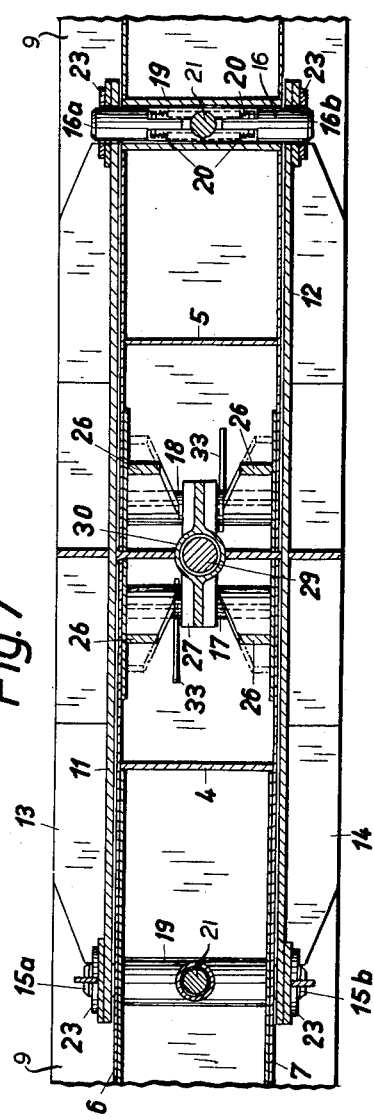
Inventor:
HUGO SEDLACEK
BY
ATTORNEY.

Dec. 4, 1962 H. SEDLACEK 3,066,332
DETACHABLE BRIDGE
Filed May 19, 1959 5 Sheets-Sheet 3
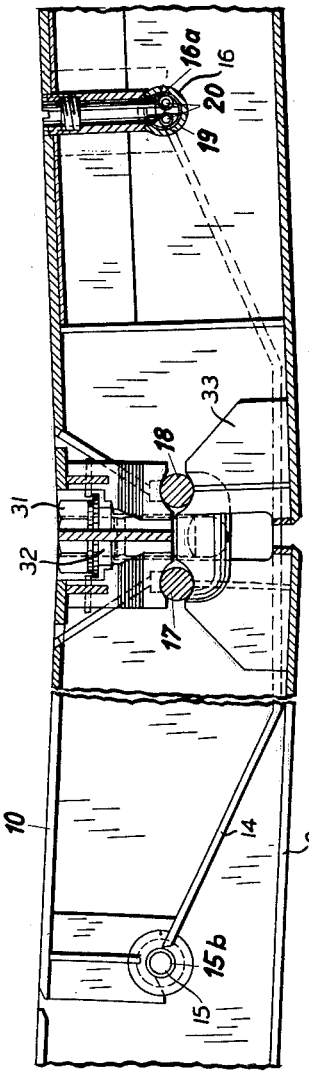
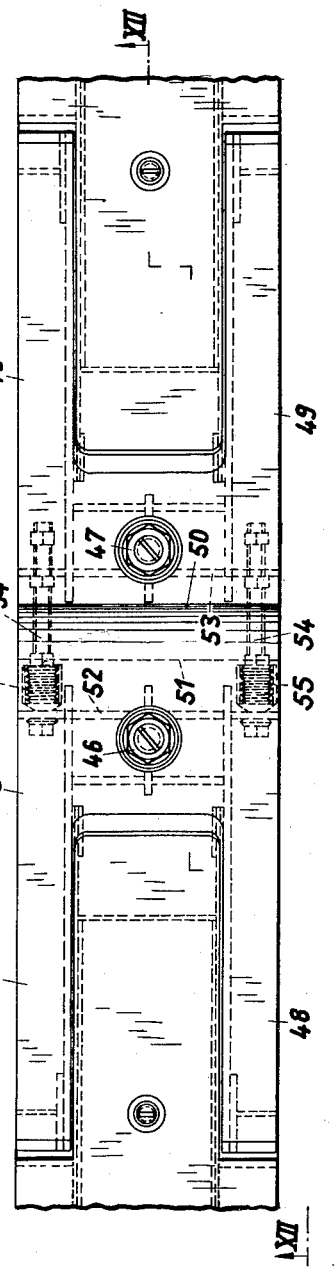
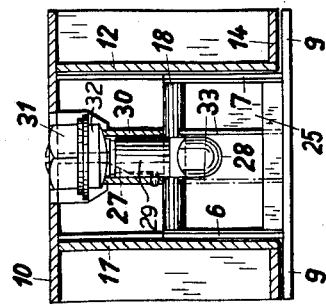
Inventor:
HUGO SEDLACEK
BY
ATTORNEY.

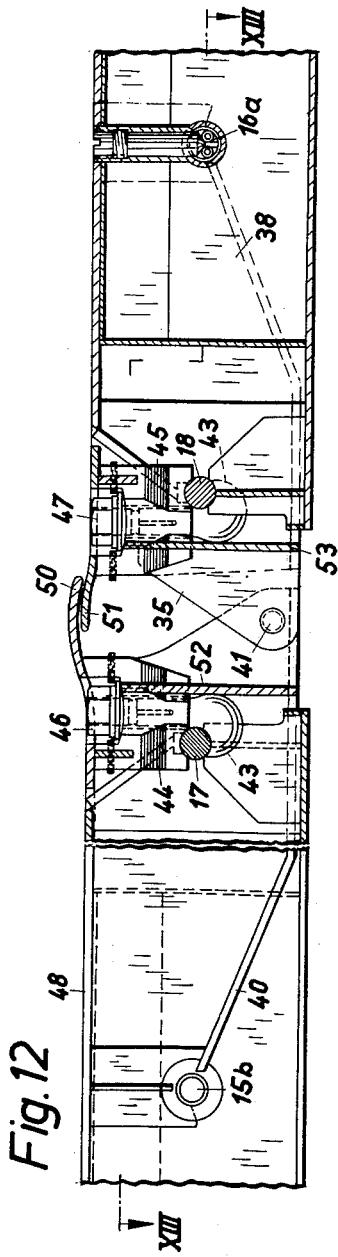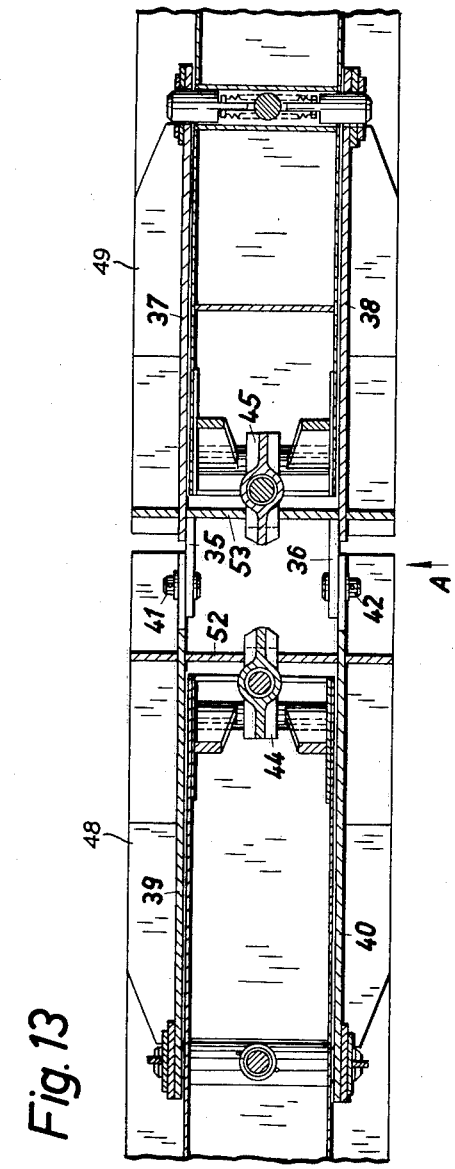

Dec. 4, 1962 H. SEDLACEK 3,066,332
DETACHABLE BRIDGE
Filed May 19, 1959 5 Sheets-Sheet 5
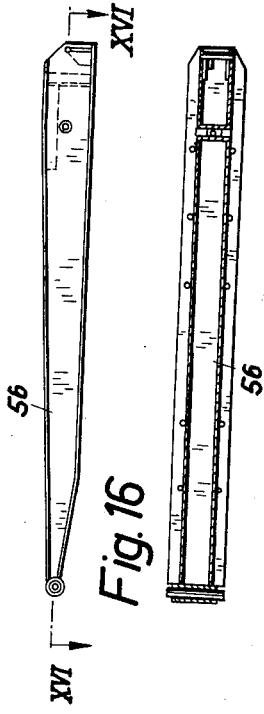
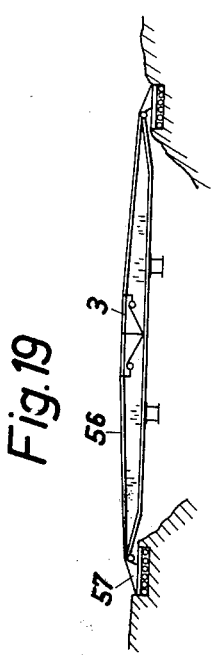
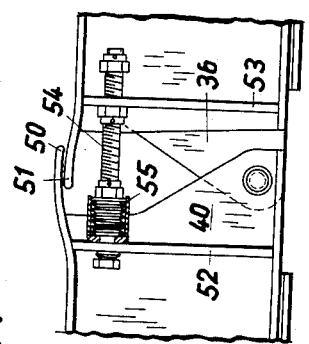
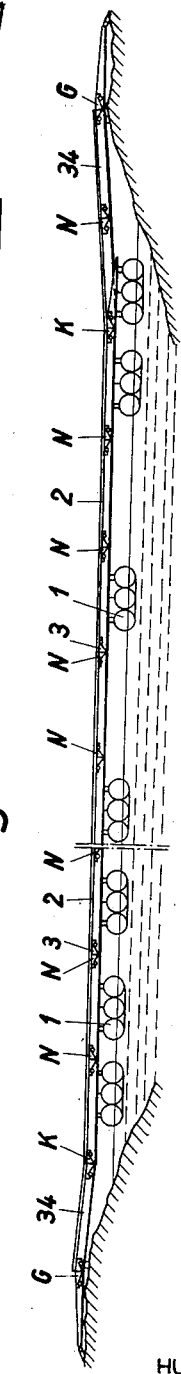
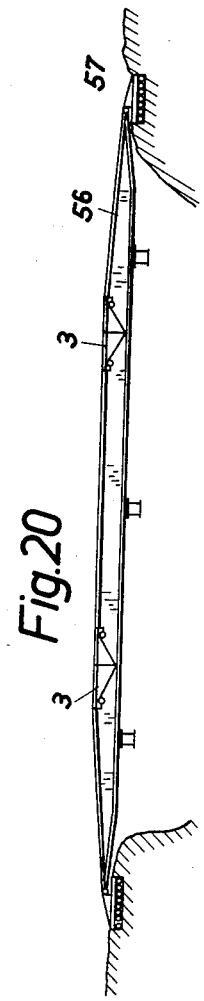
Inventor:
HUGO SEDLACEK
BY
ATTORNEY.

United States Patent Office 3,066,332
Patented Dec. 4, 1962

---

3,066,332
DETACHABLE BRIDGE
Hugo Sedlacek, Rheinhausen, Germany, assignor, by mesne assignments, to Beteiligungs- und Patentverwaltungsgesellschaft mit beschrankter Haftung, Essen, Germany
Filed May 19, 1959, Ser. No. 814,313
Claims priority, application Germany May 24, 1958
6 Claims. (Cl. 14—14)

The present invention relates to detachable bridges comprising a plurality of longitudinal girders being disposed in series arrangement and joint bars, each of which connecting adjacent ends of two of said longitudinal girders in such a manner as to receive the bending moments effective upon said longitudinal girders in a vertical plane and in a horizontal plane.

Such detachable bridges, determined to be used in case of disaster, have exchangeable individual parts. They can be applied either as floating bridges with pontoons or as culvert bridges. The longitudinal girders and the structures of the floating bodies are made advantageously of light metal. Due to the weight reduction brought about by this arrangement, it is possible to assemble the bridge by manual labor and the transportation is also simplified.

It is one object of the present invention to devise detachable bridges of the mentioned type in such a manner, that a strong connection between the longitudinal girders and the joints bars is achieved and particularly favorable conditions are created for their manufacture, as well as for their numerous application possibilities and in particular, the mounting of the detachable bridge is simplified.

It is, yet, another object of the present invention to devise detachable bridges, wherein the longitudinal girders are connected to said joint bars. In this arrangement, the median lines of all cross-bores disposed in a longitudinal girder have advantageously the same vertical distance from the underside of the longitudinal girder. For instance, the joint bars have hooks adjustable to their height which can be connected under tension with shafts of the longitudinal girders.

Until now, floating bridges have been mounted in such a manner that individual bridge ferries are floated into position and are coupled together to a bridge, which arrangement requires a smooth but not toothed engagement between the ends of the longitudinal girders, or the mounting took place over head, that means the bridge girders have been rolled over roller brackets disposed on land unto the anchored floating bodies, which arrangement requires a continuous smooth underside of the bridge girders. In connection with light floating bridges, it was not possible to use both mounting methods selectively.

It is, therefore, another object of the present invention to devise floating bridges, the mounting of which is possible either by floating of bridge ferries into position, or by rolling in the bridge girders, whereby for one and the same floating bridge both possibilities of mounting stand equal next to each other.

Since, in accordance with the present invention, shafts are provided for the connection of the joint bars with the ends of two longitudinal girders disposed in series relative to each other, which shafts sit in crosswise disposed bores of the longitudinal girders, the fabrication is appreciably simplified compared with known structures in which the joint bar is connected under tension with the longitudinal girders in even planes. The cross-bores provided in accordance with the present invention, may be obtained within narrow tolerances, so that the median lines of the axis are disposed in one plane.

Since, in contradiction to a previously known structure, the hooks of the joint bars do not project beyond the under-edge of the longitudinal girders, thus a bridge girder which is composed of a plurality of longitudinal girders has a continuous smooth underside, the girder can be advanced over roller brackets without any difficulty during the mounting process.

In floating bridges, the transfer to the land is of particular importance. If short blank slopes are present, ordinarily a ramp bridge is used, which is hingedly supported on the roadway of the bridge and on the bank. In the case of long and steep banks, so-called trestle-members are used, which are ramp bridges with one or more auxiliary yokes, hingedly supported at one end on the floating bridge. These building structures require, however, an increased number of floating bodies adjacent the bank, due to the great number of hinges and the disturbance in the continuity in the floating bridge connected therewith. Furthermore, the mounting of a ramp bridge on the floating bridge amounts to an obstacle for the traffic and causes greater wear due to the roadway step caused by the ramp wedge. On the other hand, the present invention offers the possibility to remove also these drawbacks on the passing points towards the bank. For this purpose, in accordance with another step of the present invention, joint bars are provided which form an obtuse angle open upwardly or downwardly in such a manner, that after the assembly of two longitudinal girders by means of such joint bar, the two planes which are disposed through the center lines of the two shafts of each of the longitudinal girders, form relative to each other the same angle.

It is also a further object of the present invention to provide, however, also joint bars which cnsist of two hingedly connected parts and form adjustable angles open upwardly or downwardly relative to each other.

With these and other objects in view, which will become apparent in the following detailed description, the present invention will be clearly understood in connection with the accompanying drawings, in which:

FIGURE 1 is a top plan view of a longitudinal girder;

FIG. 2 is the corresponding side view;

FIG. 3 is a section along the lines III—III of FIG. 2;

FIG. 4 is a section according to the lines IV—IV of FIG. 2;

FIG. 5 is a top plan view of a joint bar and the ends of two longitudinal girders connected thereby;

FIG. 6 is a section along the lines VI—VI of FIG. 5;

FIG. 7 is a section along the lines VII—VII of FIG. 6;

FIG. 8 is a section along the lines VIII—VIII of FIG. 6;

FIG. 9 is a section along the lines IX—IX of FIG. 6;

FIG. 10 is another embodiment of a joint bar partly in side elevation and partly in vertical section;

FIG. 11 is a top plan view of a still further embodiment of a joint bar and the ends of two longitudinal girders connected thereby;

FIG. 12 is a section along the lines XII—XII of FIG. 11;

FIG. 13 is a section along the lines XIII—XIII of FIG. 12;

FIG. 14 is a view seen in the direction of the arrow A in FIG. 13;

FIG. 15 it a side elevation of a transfer rail;

FIG. 16 is a section along the lines XVI—XVI of FIG. 15;

FIG. 17 is the reduced end of a transfer rail in accordance with FIG. 15 with a ramp wedge in side elevation;

FIG. 18 is a side elevation of a hose boat bridge; and

FIGS. 19 and 20 are side elevations of culvert bridges.

Referring now to the drawings, and in particular to FIG. 18, longitudinal girders 2 are secured to pontoons 1, whereby a plurality of the longitudinal girders 2 is disposed adjacent each other and forms directly a roadway for the bridge. The bridge ferries, formed by a pontoon 1 and longitudinal girders 2, are joined to a floating bridge, in accordance with the left hand side of FIG. 18, directly by means of joint bars 3, each of which connects two adjacent, longitudinally disposed girders. On the right-hand side of FIG. 18 are disposed longitudinal girders 2, if necessary, for a proper reinforcement between each pair of bridge ferries.

Referring now again to the drawings, and in particular to FIG. 3, the individual longitudinal girders 2 form a hollow box of rectangular cross section. The hollow boxes have cross-walls 4 and 5, disposed in some distance from their end walls, and side walls 6 and 7 so that they are closed on all sides and are, therefore, floatable. The upper and lower closing sheets of the hollow boxes project on both sides beyond the side walls 6 and 7 of the hollow box, to form the flanges 8 on the top and the flanges 9 on the bottom. These flanges 8 and 9 have bores for securing means, by means of which the longitudinal girders 2 are secured to saddles of the pontoons 1, or may be connected with longitudinal girders which are disposed thereabove. The upper flanges 8 do not reach, as is shown in FIG. 1, all the way to the end faces of the longitudinal girder 2. Consequently, the upper closing sheets of two longitudinal girders 2, disposed in series next to each other, form, as is shown in FIG. 5, an H-shaped recess. This recess is filled up nearly completely by an upper cover sheet 10 of a joint bar which sheet 10 is flush with the upper closing sheet of the hollow boxes, and which joint bar connects the two longitudinal girders 2 together. In accordance with the H-shape of the joint bar, the latter forms two beams, which engage with vertical walls 11, 12 the outer face of the side walls 6 and 7 of the longitudinal girders 2. The vertical walls 11 and 12 extend in the median portion of the joint bar closely to the lower flanges 9 of the longitudinal girders 2. Their lower edges rise, however, from two breaking points towards both ends of the joint bar and are seamed by the flanges 13 and 14.

For the connection of the joint bar with two adjacent longitudinal girders 2, in accordance with the present invention, the bolts 15, 16, 17 and 18 are provided, which bridge cross-bores of the longitudinal girders 2. The centers of the cross-bores of each longitudinal girder 2 are disposed in a horizontal plane, which has about an equal distance from the upper side and the lower side of the longitudinal girder 2.

The bolts 15 and 16 of each longitudinal girder 2, which are of larger distance from the end side of the longitudinal girder 2, comprise two parts 15a, 15b, 16a, 16b, respectively, which are slideable in a cylindrical sleeve 19, which bridge rigidly the corresponding cross-bores of the longitudinal girder 2. The two bolt parts 15a, 15, 16a, 16b, respectively, may be connected inside of the sleeve 19 by two tension springs 20, which have the tendency to pull the bolt parts into the sleeve 19. A bolt 21 enters the sleeve 19, which bolt 21 is screwed into a tubular member 22 received from above in the longitudinal girder 2. Its lower end is, as FIG. 8 shows, of wedge-shape or tapered downwardly, so that upon screwing downwardly the bolt 21, the latter presses against corresponding wedge-shaped faces of extensions of the bolt parts 15a, 15b; 16a, 16b, respectively, which extensions are arranged between the springs 20, and thus moves outwardly the bolt parts 15a, 15b; 16a, 16b, respectively. By this arrangement, the bolt parts 15a, 15b; 16a, 16b, respectively, project through bores provided in the vertical walls 11 and 12 of the joint bar and through ring discs 23 provided at the end of the vertical walls 11 and 12. In this manner, the ends of the joint bar are coupled by the bolts 15 and 16 with the two longitudinal girders 2.

The bolts 17 and 18, provided at the end of each longitudinal girder 2, are supported at their underside first of all by the cross-sheets 25 and are held claw-like from above by means of the walls 26, which extend from the bolts 17 and 18 in inclined direction upwardly in such a manner, that they move away from the end faces of the longitudinal girders 2. A space is defined between the two walls 26 of each girder 2. Pressure members 27 enter these spaces, which pressure members 27 form parts of the center piece of the joint bar and which engage from above the bolts 17 and 18 with grooves. In accordance with the showing, for instance in FIG. 6, a double-hook 28 engages from below the two bolts 17 and 18 of two longitudinal girders 2, which double-hook 28 forms the hammer head of a screw bolt 29. The latter is guided through a sleeve 30 which is disposed between the oppositely disposed pressure members 27 of the joint bar. A nut 31 is screwed to its upper end, which nut 31 rests on a plate 32 which has a ball-shaped underface. This plate 32 sits on a ball socket shaped face of the joint bar. The nut 31 is set into a recess on the upper side of the joint bar, so that the nut 31 and also the screw bolt 29 do not project appreciably beyond the cover sheet 10 of the joint bar (FIG. 6).

By tightening the screw bolt 29, the bolts 17 and 18 are tensioned between the pressure members 27 and the hammer head 28. By this arrangement and by the securing of the ends of the joint bar by means of the bolts 15 and 16, a connection between the two longitudinal girders 2 is created, which assumes unyieldingly the bending moments effective in a vertical plane as well as in a horizontal plane upon the longitudinal girders 2.

The hammer head 28 is disposed completely in the space defined by the longitudinal girders 2 and the joint bar; it does not project, therefore, downwardly relative to the underside of the longitudinal girders 2. The lower closing sheets of the two longitudinal girders 2 form an even plane which is merely interrupted by a narrow slot, so that the assembled girders 2 may be rolled forwardly without any difficulty on a roller bracket for the purpose of assembly.

As shown in FIG. 6, between the two bolts 17 and 18 of the longitudinal girders 2, connected by means of the joint bar, such great space is provided, that the hammer head 28, if it is displaced for an angle of 90° relative to the end position, which is shown in FIG. 6 in full lines, may penetrate downwardly between the two bolts 17 and 18. If it is screwed downwardly to such extent, by turning the nut 31, that it is disposed completely in the space below the bolts 17 and 18, it is turned for an angle of 90° clockwise (FIG. 7). This rotation is limited by walls 33 which sit in each longitudinal girder 2. Thus, it will then be raised by turning the nut 31 until it engages the underside of the shafts 17 and 18.

FIG. 10 shows a joint bar which is broken in such a manner that it forms an obtuse angle open upwardly with its upper side. Thus, the planes which extend through the center lines of the bolts 15, 17 and 16, 18 respectively, co-ordinated to each of the longitudinal girders 2, form the same obtuse angle relative to each other. Such joint bars are dominantly provided at the joining points between the bank ramps and the actual floating bridge. In this connection, attention is called to FIG. 18 in which, at the points marked by N, normal, i.e. straight joint bars, in accordance with FIGS. 5 to 7, and at the points marked by K, broken joint bars in accordance with FIG. 10 are used. The angle of the latter is equal to the angle at which the longitudinal girders 2 forming the bank ramps 34 are connected with the horizontal longitudinal girders of the main part of the bridge. By the connection of the longitudinal girders 2 at these places by means of the broken joint bars, steps are avoided which were created until now in such a manner, that the ramp wedge was mounted on the road girders of the floating bridge. The angle of the broken joint bars can be also open in downward direction under certain circumstances.

In order to accommodate selectively the angle at which the joint bar connects together two longitudinal girders to the unforeseen conditions on the bank slope, a hinged joint bar (FIGS. 11 to 14) has been developed. This hinged joint bar follows substantially the basic structure of the joint bars of FIGS. 5 to 10; it consists, however, of two parts which are hingedly connected together adjacent their undersides. For this purpose, the sheets 35 and 36 which are attached to the side walls 37 and 38 of one half of the joint bar are disposed in engaging manner to the inner side of the side walls 39 and 40 of the other half of the joint bar and connected together by means of a short hinge bolt 41 and 42, which is disposed slightly above the under edge of the joint bar. Each half of the joint bar has a particular simple hook 43 which engages from below the bolts 17 and 18 of the corresponding longitudinal girder. Each half of the joint bar has also a particular pressure member 44 and 45 which is disposed on the upper side of the bolts 17 and 18, respectively, and through which the guide sleeve for the hook screw projects, whereby each hook screw of the two halves of the joint bar has a particular nut 46 and 47. The upper closing sheets 48 and 49 of the two halves of the joint bar overlap each other with their opposite ends 50 and 51 and are curved according to a cylinder, the axis of which coincides with the center of the hinge bolts 41 and 42. Thus, in each angular position of the two halves of the joint bars relative to each other, the slot formed therebetween is covered up.

A threaded bolt 54 engages each vertical end wall 52, 53 of the two halves of the joint bar, which threaded bolts 54 are disposed closely below the upper cover sheets 48 and 49. The angle between the two halves of the joint bar may be adjusted by means of these bolts 54. A certain yielding of this adjustment is brought about in such a manner that the bolts 54 are connected with the end wall 52 by means of spring blades 55, which may receive a certain pretension.

As FIG. 18 shows, hinged joint bars may be provided, for instance at the points indicated by G, the required angular position between the two longitudinal girders being always adjustable, and one of the girders forming, for instance, a transfer rail, as shown in FIGS. 15 to 17.

It may be recognized from these figures that the transfer rail is a longitudinal girder which coincides at its end with the formation of the longitudinal girder disclosed in FIGS. 1 to 4, which, however, is tapered down towards the other end as to its height. At the thin end of the transfer rail 56, a ramp wedge 57 is provided. For the hooks 28 and 43, which are used in the joint bars in accordance with the present invention, a particularly favorable manufacture results by providing first a blank with bores and thereafter the ring formed by the bore is broken off properly in order to achieve the hook mouth. Accordingly, the recess which serves as engagingface for the bolts 17 and 18, is formed by a portion of the bore produced to a predetermined tolerance.

As may be determined from FIGS. 19 and 20, the joint bars, the longitudinal girders and the transfer rails, as they are used in accordance with the above statements for floating bridges, may serve for the assembly of culvert bridges, which extend over a culvert or the like, without support of floating bodies.

While I have disclosed several embodiments of the present invention, it is to be understood that these embodiments are given by example only and not in a limiting sense, the scope of the present invention being determined by the objects and the claims.

I claim:
1. A detachable bridge comprising
 a plurality of longitudinal girders disposed in series arrangement, each of said longitudinal girders having substantially vertical first side walls,
 a joint bar releasably connecting adjacent ends of two of said longitudinal girders,
 said joint bar comprising a center portion and two oppositely disposed vertical second side walls defining a space therebetween and to assume an H-shape seen from above,
 the end portions of said two of said longitudinal girders extending into said space defined by and engaging tightly the inner faces of said vertical second side walls,
 the latter having first cross-bores disposed near their ends,
 said vertical first side walls of said longitudinal girders having complementary second cross-bores,
 a sleeve bridging said second cross-bores and aligned with said first cross-bores,
 a pair of first bolts received in and guided by each of said sleeves,
 means for providing axial movement of said first bolts from each other and towards each other, respectively, so that said first bolts extend into said first cross-bores and are withdrawn therefrom, respectively,
 said means being disposed in said longitudinal girders and operable from the top of the latter,
 a second bolt supported by and disposed parallel to said first bolts at the corresponding end of each of said longitudinal girders,
 the upper portion of said longitudinal girders being cut away to provide access to said second bolts from above,
 said joint bar having pressure members in its center portion,
 said pressure members engaging from above said second bolts of two longitudinal girders disposed in series,
 a hook member supported by the top of said joint bar and disposed below said second bolts,
 and means for raising and lowering said hook member operable from the top to clamp said second bolts against said pressure members.
2. The detachable bridge, as set forth in claim 1, wherein said hook member is a double hook rotatable about a vertical axis,
 said hook member is disposed in all its positions within a space defined by said adjacent longitudinal girders and said joint bar,
 a vertical wall is disposed parallel and set off to the longitudinal axis of said longitudinal girders below each of said second bolts and mounted in the corresponding of said longitudinal girders, and
 said vertical walls preventing rotation of said hook member beyond a position in which it assumes a clamping position against said second bolts.
3. A detachable bridge comprising
 a plurality of longitudinal girders disposed in series arrangement,
 each of said longitudinal girders having substantially vertical first side walls,
 a joint bar releasably connecting adjacent ends of two of said longitudinal girders,
 said joint bar comprising a center portion and two oppositely disposed vertical second side walls defining a space therebetween and to assume an H-shape seen from above,
 the end portions of said two of said longitudinal girders extending into said space defined by and engaging tightly the inner faces of said vertical second side walls,
 the latter having first cross-bores disposed near their ends,
 said vertical first side walls of said longitudinal girders having complementary second cross-bores,
 a sleeve bridging said second cross-bores and aligned with said first cross-bores, a pair of first bolts received in and guided by each of said sleeves,
a threaded bolt received threadedly vertically from above in said longitudinal girder,
said sleeve having an opening,
the latter receiving the lower end of said threaded bolt,
the lower end of said threaded bolt being wedge-shaped and the inner end of said first bolts is of a complementary wedge shape, in order to engage the corresponding faces of said first bolts with those of said threaded bolt,
spring means connecting said first bolts and tending to move said first bolts in axial direction toward each other,
a second bolt supported by and disposed parallel to said first bolts at the corresponding end of each of said longitudinal girders,
the upper portion of said longitudinal girders being cut away to provide access to said second bolts from above,
said joint bar having pressure members, in its center portion,
said pressure members engaging from above said second bolts of two longitudinal girders disposed in series,
a hook member supported by the top of said joint bar and disposed below said second bolts,
and means for raising and lowering said hook member operable from the top to clamp said second bolts against said pressure members.

4. A detachable bridge comprising
a plurality of longitudinal girders disposed in series arrangement,
each of said longitudinal girders having substantially vertical first side walls,
a joint bar releasably connecting adjacent ends of two of said longitudinal girders,
said joint bar consisting of two halves pivotally connected at their bottom portion,
each of said halves comprising substantially two side walls and a crosswise disposed end wall arranged in such manner, that each of said halves is of U-shape seen from above,
said longitudinal girders projecting into the spaces defined between said side walls of the corresponding half of said joint bar and engaging tightly the inner faces of said side walls,
said side walls of each half of said joint bar having first cross-bores adjacent their ends,
said vertical first side walls of said longitudinal girders having complementary second crossbores,
a sleeve bridging said second cross-bores and aligned with said first cross-bores,
a pair of first bolts received in and guided by each of said sleeves,
means for providing axial movement of said first bolts from each other and towards each other, respectively, so that said first bolts extend into said first cross-bores and are withdrawn therefrom, respectively,
said means being disposed in said longitudinal girders and operable from the top of the latter,
a second bolt supported by and disposed parallel to said first bolts at the corresponding end of each of said longitudinal girders,
the upper portion of said longitudinal girders being cut away to provide access to said second bolts from above,
each half of said joint bar having pressure members,
said pressure members engaging from above said second bolts of two longitudinal girders disposed in series,
a hook member supported by the top of said joint bar and disposed below said second bolts,
and means for raising and lowering said hook member operable from the top to clamp said second bolts against said pressure members.

5. A detachable bridge comprising
a plurality of longitudinal girders disposed in series arrangement, each of said longitudinal girders having substantially vertical first side walls,
a joint bar releasably connecting adjacent ends of two of said longitudinal girders,
said joint bar consisting of two halves pivotally connected at their bottom portion,
said halves of said joint bar being connected above said pivot connection by adjustable members and resilient yielding means,
each of said halves comprising substantially two side walls and a crosswise disposed end wall arranged in such manner, that each of said halves is of U-shape seen from above,
said longitudinal girders projecting into the spaces defined between said side walls of the corresponding half of said joint bar and engaging tightly the inner faces of said side walls,
said side walls of each half of said joint bar having first cross-bores adjacent their ends,
said vertical first side walls of said longitudinal girders having complementary second cross-bores,
a sleeve bridging said second cross-bores and aligned with said first cross-bores,
a pair of first bolts received in and guided by each of said sleeves,
means for providing axial movement of said first bolts from each other and towards each other, respectively, so that said first bolts extend into said first cross-bores and are withdrawn therefrom, respectively,
said means being disposed in said longitudinal girders and operable from the top of the latter,
a second bolt supported by and disposed parallel to said first bolts at the corresponding end of each of said longitudinal girders,
the upper portion of said longitudinal girders being cut away to provide access to said second bolt from above,
each half of said joint bar having pressure members,
said pressure members engaging from above said second bolts of two longitudinal girders disposed in series,
a hook member supported by the top of said joint bar and disposed below said second bolts,
and means for raising and lowering said hook member operable from the top to clamp said second bolts against said pressure members.

6. A detachable bridge comprising
a plurality of longitudinal girders disposed in series arrangement, each of said longitudinal girders having substantially vertical first side walls,
a joint bar releasably connecting adjacent ends of two of said longitudinal girders,
said joint bar consisting of two halves pivotally connected at their bottom portion,
each of said halves comprising substantially two side walls and a crosswise disposed end wall arranged in such manner, that each of said halves is of U-shape seen from above,
said longitudinal girders projecting into the spaces defined between said side walls of the corresponding half of said joint bar and engaging tightly the inner faces of said side walls,
said side walls of each half of said joint bar having first cross-bores adjacent their ends,
said vertical first side walls of said longitudinal girders having complementary second cross-bores,
a sleeve bridging said second cross-bores and aligned with said first cross-bores,
a pair of first bolts received in and guided by each of said sleeves, means for providing axial movement of said first bolts from each other and towards each other, respectively, so that said first bolts extend into said first cross-bores and are withdrawn therefrom, respectively, said means being disposed in said longitudinal girders and operable from the top of the latter, a second bolt supported by and disposed parallel to said first bolts at the corresponding end of each of said longitudinal girders, the upper portion of said longitudinal girders being cut away to provide access to said second bolts from above, each half of said joint bar having pressure members, said pressure members engaging from above said second bolts of two longitudinal girders disposed in series, a hook member supported by the top of said joint bar and disposed below said second bolts, and means for raising and lowering said hook member operable from the top to clamp said second bolts against said pressure members, and at least one of said two girders disposed at one end of said bridge being formed as a transfer rail having at one end only a pair of said first bolts and a single one of said second bolts and of diminishing height from said one end.

References Cited in the file of this patent

UNITED STATES PATENTS

| | | |
|---|---|---|
| 2,211,375 | Greulich | Aug. 13, 1940 |
| 2,424,371 | Scott | July 22, 1947 |
| 2,636,197 | Odot | Apr. 28, 1953 |
| 2,647,270 | Frost | Aug. 4, 1953 |
| 2,681,190 | Thomson | June 15, 1954 |

FOREIGN PATENTS

| | | |
|---|---|---|
| 529,231 | Belgium | June 15, 1954 |
| 940,715 | Germany | Mar. 22, 1956 |